United States Patent [19]

Matsumoto et al.

[11] Patent Number: 5,741,860
[45] Date of Patent: Apr. 21, 1998

[54] THERMOPLASTIC RESIN COMPOSITION AND TRIM PARTS FOR INTERIOR DECORATION OF AUTOMOBILE

[75] Inventors: Shigemi Matsumoto, Akashi; Akinaga Goda, Fukuoka, both of Japan

[73] Assignee: Kanegafuchi Kagaku Kogyo Kabushiki Kaisha, Osaka-Fu, Japan

[21] Appl. No.: 652,476

[22] PCT Filed: Nov. 1, 1995

[86] PCT No.: PCT/JP95/02237

§ 371 Date: Jun. 18, 1996

§ 102(e) Date: Jun. 18, 1996

[87] PCT Pub. No.: WO96/15190

PCT Pub. Date: May 23, 1996

[30] Foreign Application Priority Data

Nov. 11, 1994 [JP] Japan ................... 6-303064

[51] Int. Cl.⁶ .................................................. C08L 33/06
[52] U.S. Cl. ................................ 525/230; 296/146.7
[58] Field of Search ..................... 525/230; 296/146.7

[56] References Cited

U.S. PATENT DOCUMENTS

| | | | |
|---|---|---|---|
| 4,657,976 | 4/1987 | Ott et al. | 525/230 |
| 4,954,571 | 9/1990 | Iwamoto et al. | 525/230 |
| 5,116,909 | 5/1992 | Mishima et al. | 525/230 |

*Primary Examiner*—Melvyn I. Marquis
*Assistant Examiner*—D. Aylward
*Attorney, Agent, or Firm*—Armstrong, Westerman, Hattori, McLeland & Naughton

[57] ABSTRACT

A thermoplastic resin composition is disclosed, which comprises 5–55 weight % of a copolymer (A) whose glass transition temperature is not more than 0° C., and 95–45 weight % of a high α-methylstyrene-content ABS resin (B) and/or a maleimide-type ABS resin (C), both (B) and (C) being not less than 100° C. in thermal deformation temperature (load 18.6 kg/cm²), and said resin composition being not less than 10 kg.cm/cm in Izod impact strength (23° C.). The resin composition provides molded articles less deformable at high temperatures, low in impact-induced stress, i.e. high in impact energy absorptivity, and thus is suitable for trim parts for use in interior decoration of automobiles.

5 Claims, 1 Drawing Sheet

THERMOPLASTIC RESIN COMPOSITION AND TRIM PARTS FOR INTERIOR DECORATION OF AUTOMOBILE

FIELD OF THE INVENTION

The present invention relates to a thermoplastic resin composition low in stiffness such as bending strength, high in impact strength, low in impact-induced stress, i.e., high in impact energy absorptivity, high in resistance to thermal deformation and excelled in moldability, and trim parts molded therefrom for use in interior decoration of automobiles.

BACKGROUND OF THE INVENTION

Styrene-type resins, ABS resins in particular, have many uses for their low stiffness and outstanding impact strength and resistance to thermal deformation. Meanwhile, as trim parts for interior decoration of automobiles, well known are front pillar garnishes, side roof garnishes, center pillar garnishes and incorporated units thereof, which are molded of ABS resins, polypropylene-type resins etc. With these parts, importance has hitherto been attached to such properties as dimensional stability at high temperatures and external appearance. In the United States, there is also a side collision control which requires safety also in case of collision from side.

To meet these requirements, various studies have been made but to date there are but few found to be truly satisfactory.

For example, a method of adding a specific plasticizer to rubber-reinforced styrene-type resins was disclosed in Japanese Laid-open Patent Publication No. 20346/'84 but in this method, too, the resistance to thermal deformation was low and, further, the plasticizer tends to evaporate in use and bleed to cause change of resin properties. Attempts have been made to use a polypropylene-type resin having a specific composition but this also has a number of drawbacks such as poor external appearance due to formation of minor sinks, insufficient dimensional stability due to warping, and poor adhesiveness to other materials. Further, attempts have been made to fill foams such as polyethylene into the inner side of trim parts but failed due to complexity of producing process and expensiveness.

Meanwhile, in recent years ABS resins and acrylic ester-type copolymer compositions are known to improve chemical resistance. For instance, compositions composed of rubber-containing styrene-type resins and high gel-content acrylic ester copolymers proposed in Japanese Laid-open Patent Publication No. 179257/'83 and compositions composed of rubber-containing maleimide-styrene-type copolymers, ABS resins and acrylic ester-type copolymers proposed in Japanese Laid-open Patent Publication No. 17954/'88 are described to be effective for improving chemical resistance. These compositions, however, fail to provide resin compositions low in impact-induced stress, i.e., high in impact energy absorptivity, high in impact strength, highly resistant to thermal deformation and excelled in moldability. That is, these compositions proposed were designed for the improvement of chemical resistance as the major object and had defects of being low in resistance to thermal deformation and moldability with the former, and being low in impact energy absorptivity and impact strength with the latter.

It is an object of the present invention to provide a thermoplastic resin composition low in stiffness such as bending strength, high in impact strength, low in impact-induced stress i.e., high in impact energy absorptivity, highly resistant to thermal deformation and also excelled in moldability and also provide trim parts for interior decoration of automobiles made thereof to thereby solve the aforementioned problems.

After intensive studies for accomplishment of these problems, the present inventors have found that a thermoplastic resin composition composed of a specific copolymer (A), a high α-methylstyrene-content ABS resin (B) and/or a maleimide-type ABS resin (C) is low in stiffness, high in impact strength, low in impact-induced stress i.e., high in impact energy absorptivity, highly resistant to thermal deformation and also excelled in moldability and thus arrived at the present invention.

DISCLOSURE OF THE INVENTION

The present invention relates to a thermoplastic resin composition comprizing 5–55 weight % of a copolymer (A) not more than 0° C. in glass transition temperature, and 95–45 weight % of a high α-methylstyrene-content ABS resin (B), and/or a maleimide-type ABS resin (C), both (B) and (C) being not less than 100° C. in thermal deformation temperature (load 18.6 Kg/cm$^2$), and said resin composition being not less than 10 kg.cm/cm in Izod impact strength (23° C.).

BEST MODES OF PRACTICING THE INVENTION

In the present invention, the glass transition temperature (Tg) of the copolymer (A) (measured by differential thermal analysis) is of particular importance. The glass transition temperature (Tg) of the copolymer (A) is not more than 0° C., preferably not more than −10° C. and more preferably not more than −15° C. If Tg is in excess of 0° C., the bending strength or the like of the thermoplastic resin composition is increased, this resulting in failure to obtain a composition low in stiffness, low in impact-induced stress and excelled in impact energy absorptivity.

As the copolymers (A) used in the present invention, there are included acrylic ester-type copolymers and olefin-type copolymers, which may be used alone or in combination of two or more.

Of the copolymers (A), the acrylic ester-type copolymer may be preferably comprized of 40–85 weight %, preferably 45–85 weight % and more preferably 50–80 weight % of alkyl (meth)acrylates, not more than 25 weight %, preferably not more than 20 weight % and more preferably not more than 15 weight % of aromatic vinyl compounds and 15–35 weight %, preferably 17–33 weight % of vinyl cyanide compounds, which have 0.2–1.5 dl/g, preferably 0.3–1.3 dl/g and more preferably 0.35–1.0 dl/g in reduction viscosity (30° C., in N,N-dimethylformamide solution).

As the alkyl (meth)acrylates, there are included methyl acrylate, ethyl acrylate, butyl acrylate, 2-ethylhexyl acrylate, lauryl acrylate, stearyl acrylate, 2-hydroxyethyl acrylate, glycidyl acrylate, methyl methacrylate, lauryl methacrylate, stearyl methacrylate, 2-hydroxydiethyl methacrylate and glycidyl methacrylate and these may be used alone or in combination of two or more.

As the aromatic vinyl compounds, there are included styrene, α-methylstyrene, p-styrene, vinylnaphthalene, chlorostyrene and bromostyrene and these may be used alone or in combination of two or more.

As the vinyl cyanide compounds, there are included acrylonitrile and methacrylonitrile, and these may as well be used alone or in combination of two or more.

If the alkyl (meth)acrylate is less than 40 weight %, stiffness is high, impact-reduced stress is high and impact energy absorptivity is low, and if it is in excess of 85 weight %, resistance to thermal deformation is high and peeling tends to take place. If the aromatic vinyl compound is in excess of 25 weight %, impact strength is low and impact energy absorptivity is low. If the vinyl cyanide compound is less than 15 weight %, peeling tends to take place and impact energy absorptivity is low, and if it is in excess of 35 weight %, peeling tends to take place, stiffness is high, impact strength is low and impact-induced stress is low, i.e., impact energy absorptivity is low.

If the reduction viscosity of the acrylic ester copolymer is less than 0.2 dl/g, impact strength is low and impact energy absorptivity is low, and if it exceeds 1.5 dl/g, moldability is low.

Of the copolymers (A), as the olefin-type copolymers, there are included ethylene-ethyl acrylate copolymers, ethyl acrylate-maleic anhydride copolymers, ethylene-butyl acrylate-carbon monoxide copolymers, ethylene-propylene-styrene copolymers and propylene-styrene copolymers and these may be used alone or in combination of two ore more.

The melt index of the olefin-type copolymers is not particularly limited but may preferably be in a range of 1–100 g/10 min. (190° C., load: 2.16 kg). If it is less than 1 g/10 min., moldability will be deteriorated, and if it is in excess of 100 g/10 min., impact strength and chemical resistance may possibly be lowered.

The high α-methylstyrene-content ABS resin (B) is preferably comprized of a copolymer (Bc) and a graft copolymer (Bg);

30–85 weight %, preferably 35–75 weight % and more preferably 40–75 weight % of the copolymer (Bc) comprizing 60–80 weight %, preferably 63–78 weight % and more preferably 65–76 weight % of α-methylstyrene, not more than 25 weight %, preferably not more than 15 weight % and more preferably not more than 10 weight % of aromatic vinyl compounds and 20–35 weight %, preferably 22–33 weight % and more preferably 24–33 weight % of vinyl cyanide compounds, with its reduction viscosity being 0.3–1.5 dl/g, preferably 0.4–1.2 dl/g and more preferably 0.45–0.9 dl/g (30° C., in N, N-dimethylformaldehyde solution), and 70–15 weight %, preferably 65–25 weight % and more preferably 60–25 weight % of the graft copolymer (Bg) comprizing 30–90 weight %, preferably 40–80 weight % and more preferably 45–75 weight % of at least one rubber polymer selected from the group consisting of diene-type rubbers, olefin-type rubbers and acryl-type rubbers graft-polymerized with 70–10 weight %, preferably 60–20 weight % and more preferably 55–25 weight % of a monomer mixture of 20–90 weight %, preferably 25–80 weight % and more preferably 30–78 weight % of aromatic vinyl compounds, not more than 40 weight %, preferably not more than 35 weight % and more preferably not more than 33 weight % of vinyl cyanide compounds, not more than 85 weight %, preferably not more than 80 weight % and more preferably not more than 75 weight % of alkyl methacrylates and 0–20 weight %, preferably 0–10 weight % and more preferably 0–5 weight % of other copolymerizable monomers.

As the aromatic vinyl compounds used for the preparation of the copolymer (Bc), there are included, p-styrene, vinylnaphthalene, chlorostyrene and bromostyrene, as the vinyl cyanide compounds, there are included acrylonitrile and methacrylonitrile and as the other copolymerizable monomers, there are included alkyl (meth)acrylates such as methyl methacrylate, butyl methacrylate, 2-ethylhexyl methacrylate, methyl acrylate, ethyl acrylate, butyl acrylate, 2-ethylhexyl acrylate and glycidyl methacrylate. These, may be used alone or in combination of two or more.

With copolymer (Bc), thermal deformation temperature is lowered when the ratio of the α-methylstyrene is less than 60 weight %, while, when its ratio exceeds 80 weight %, the polymerization stability is lowered. The thermal deformation temperature is also lowered when the ratio of the aromatic vinyl compound is in excess of 25 weight %. When the ratio of the vinyl cyanide compound is less than 20 weight %, impact strength and peeling resistance both lower, and when it exceeds 35 weight %, stiffness becomes high, while impact strength and peeling resistance are lowered.

When the reduction viscosity of the copolymer (Bc) is less than 0.3 dl/g, impact strength is lowered and when it exceeds 1.5 dl/g, moldability is deteriorated.

Of the rubber polymers used for the preparation of the graft copolymer (Bg), as the diene-type rubbers there are included polybutadiene rubber, butadiene-styrene rubber (SBR), butadiene-styrene block copolymer, hydrogenated butadiene-styrene rubber (SEBS) and butadiene-acrylonitrile rubber, as the olefin-type rubbers there are included ethylene propylene rubber (EPR) and ethylene-propylene-diene rubber (EPDR), and as the acryl-type rubbers there are included polybutyl acrylate rubber and butadiene-butyl acrylate rubber. These may as well be used alone or in combination of two or more.

As the aromatic vinyl compounds used for the preparation of the graft copolymer (Bg), there are included styrene, α-methylstyrene, p-styrene, vinylnaphthalene, chlorostyrene and bromostyrene, as the vinyl cyanide compounds, there are included acrylonitrile and methacrylonitrile, as the alkyl methacrylates, there are included methyl methacrylate, ethyl methacrylate, butyl methacrylate, 2-ethylhexyl methacrylate, lauryl methacrylate, stearyl methacrylate, 2-hydroxyethyl methacrylate and glycidyl methacrylate, and as the other copolymerizable monomers, there are included methacrylic acid, acrylic acid, phenylmaleimide and maleimide. These may be used alone or in combination of two or more.

When the ratio of the aromatic vinyl compound is less than 20 weight %, moldability is lowered and when it is in excess of 90 weight %, impact strength is decreased. When the ratio of the vinyl cyanide compound exceeds 40 weight %, both impact strength and peeling resistance are lowered. When the ratio of the alkyl methacrylate exceeds 85 weight %, moldability is deteriorated. Further, when the ratio of the other copolymerizable monomers exceed 20 weight %, impact strength is decreased.

In the graft copolymer (Bg), impact strength is decreased when the ratio of the rubber polymers is less than 30 weight % or more than 90 weight %.

As to the ratio of the aforementioned copolymer (Bc) and the graft copolymer (Bg), when the ratio of the copolymer (Bc) is less than 30 weight %, thermal deformation temperature is lowered and moldability is deteriorated, and when it exceeds 85 weight %, impact strength is decreased.

The maleimide-type ABS resin (C) is comprized of a copolymer (Cc) and a graft copolymer (Cg);

30–85 weight %, preferably 35–75 weight % and more preferably 40–75 weight % of the copolymer (Cc) comprizing 10–50 weight %, preferably 13–45 weight % and more preferably 15–40 weight % of maleimide compounds, 80–15 weight %, preferably 75–20 weight % and more preferably 70–25 weight % of aromatic vinyl compounds, 10–35 weight %, preferably 13–30 weight % and more preferably 15–25 weight % of vinyl cyanide compounds, 0–20 weight %, preferably 0–10 weight % and more preferably 0–5 weight % of other copolymerizable monomers, with its reduction viscosity being 0.3–1.5 dl/g, preferably 0.4–1.2 dl/g and more preferably 0.45–0.9 dl/g (30° C., in N,N-dimethylformamide solution), and 70–15 weight %, preferably 65–25 weight % and more preferably 60–25 weight % of the graft copolymer (Cg) comprizing 30–90 weight %, preferably 40–80 weight % and more preferably 45–75 weight % of at least one rubber polymer selected from the group consisting of diene-type rubbers, olefin-type rubbers and acryl-type rubbers graft-polymerized with 70–10 weight %, preferably 60–20 weight % and more preferably 55–25 weight % of a monomer mixture of 20–90 weight %, preferably 25–80 weight % and more preferably 30–78 weight % of aromatic vinyl compounds, not more than 40 weight %, preferably not more than 35 weight % and more preferably not more than 33 weight % of vinyl cyanide compounds, not more than 85 weight %, preferably not more than 80 weight % and more preferably not more than 75 weight % of alkyl methacrylates and 0–20 weight %, preferably 0–10 weight % and more preferably 0–5 weight % of other copolymerizable monomers.

As the maleimide compounds used for the preparation of the copolymers (Cc), there are included phenylmaleimide, methylmaleimide, butylmaleimide, cyclohexylmaleimide, p-methylphenylmaleimide and p-chlorophenylmaleimide, as the aromatic vinyl compounds, there are included styrene, p-styrene, vinylnaphthalene, chlorostyrene and bromostyrene, as the vinyl cyanide compounds, there are included acrylonitrile and methacrylonitrile and, further, as the other copolymerizable monomers, there are included methyl acrylate, ethyl acrylate, butyl acrylate, 2-ethylhexyl acrylate, lauryl acrylate, stearyl acrylate, 2-hydroxyethyl acrylate, glycidyl acrylate, methyl methacrylate, ethyl methacrylate, butyl methacrylate, 2-ethylhexyl methacrylate, lauryl methacrylate, stearyl methacrylate, 2-hydroxyethyl methacrylate, glycidyl methacrylate, acrylamide, methacrylamide and α-methylstyrene, and these may be used alone or in combination of two or more.

When the ratio of the maleimide compound is less than 10 weight %, thermal deformation temperature is lowered and, when it exceeds 50 weight %, impact strength is decreased. Impact strength is decreased when the ratio of the aromatic vinyl compound is less than 15 weight %, and thermal deformation temperature is lowered when it exceeds 80 weight %. When the ratio of the vinyl cyanide compound is less than 10 weight %, impact strength is decreased, while moldability and peeling resistance are lowered when it exceeds 35 weight %. Further, impact strength is decreased when the ratio of the other copolymerizable monomers exceeds 20 weight %. Impact strength is also decreased when the reduction viscosity of the copolymer (Cc) is less than 0.3 dl/g and moldability is lowered when it exceeds 1.5 dl/g.

The graft copolymer (Cg) may be the same as the aforementioned graft copolymer (Bg).

As to the ratio of the copolymer (Cc) and the graft copolymer (Cg), thermal deformation temperature and moldability are lowered when the (Cc) ratio is less than 30 weight % and impact strength is decreased when it exceeds 85 weight %.

The high α-methylstyrene-content ABS resin (B) and the maleimide-type ABS resin (C) are required to have a thermal deformation temperature of not less than 100° C. (load 18.6 Kg/cm$^2$). If the thermal deformation temperature is less than 100° C., a resin composition having sufficient thermal deformation resistance can not be provided.

There is no specific limitation with regard to the producing method for the copolymer (A), the copolymer (Bc) and the graft copolymer (Bg) of the high α-methylstyrene-content ABS resin (B), the copolymer (Cc) and graft copolymer (Cg) of the maleimide-type ABS resin (C) and any of the known methods such as emulsion polymerization, emulsion-suspension polymerization, emulsion-bulk polymerization, suspension polymerization and solution polymerization may be used.

The thermoplastic resin composition of the present invention is comprized of 5–55 weight %, preferably 7–50 weight % and more preferably 7–45 weight % of the aforementioned copolymer (A) and 95–45 weight %, preferably 93–50 weight % and more preferably 93–55 weight % of the aforementioned high α-methylstyrene-content ABS resin (B) and/or the maleimide-type ABS resin (C). Stiffness becomes higher when the ratio of the copolymer (A) is less than 5 weight %, and thermal deformation temperature is lowered when its ratio exceeds 55 weight %.

Production of the thermoplastic resin of the present invention is feasible by known methods. For example, the copolymer (A), the high α-methylstyrene-content ABS resin (B) and/or the maleimide-type ABS resin (C), obtained by emulsion polymerization, may be mixed in a latex form and may be used after salting-out, coagulation and drying. It is also possible to produce the copolymer (A) and the high α-methylstyrene-content ABS resin (B) and/or the maleimide-type ABS resin (C) in the same polymerization vessel.

It is also possible to use after kneading powder or pellets of the copolymer (A) and the high α-methylstyrene-content ABS resin (B) and/or the maleimide-type ABS resin (C) with a roll, a screw, a Bumbury's mixer, a kneader or the like. In mixing, if necessary, such additives may be added as stabilizers, lubricants, plasticizers, photo-stabilizers, UV-absorbing agents, dyes and pigments, fillers, anti-fungus agents and fire retardants.

Further, it is possible to add to the resin composition of the present invention such other resins as polycarbonate resins, polyvinyl chloride resins, polyethylene terephthalate resins, polybutyrene terephthalate resins and polyamide resins.

Stiffness, thermal deformation, resistance impact strength, surface characteristic, peeling resistance of the surface layer etc. depend on the composition of the copolymer (A), the high α-methylstyrene-content ABS resin (B) and/or the maleimide-type ABS resin (C) as well as the combination thereof and mixing ratios.

For the combination of the copolymer (A), the high α-methylstyrene-content ABS resin (B) and/or the maleimide-type ABS resin (C), the following will serve as a good guide.

When (a) and (b) are as defined below, (a)=Vinyl cyanide weight % of the copolymer (A)+ [acrylic ester weight %+methacrylic ester weight %]/10

(b)=Vinyl cyanide weight % in methyl ethyl ketone-soluble matters of the high α-methylstyrene-content ABS resin (B) and/or the maleimide-type ABS resin (C)+ maleimide weight %+|acrylic ester weight %+methacrylic ester weight %|/10, if (a)–(b) is within a range as mentioned below.

$$-10 \leq (a)-(b) \leq 10$$

good molded articles having good impact strength, surface characteristic and peeling resistance can be provided through good compatibility of the resins (A), (B) and/or (C).

In the above, (a) is a measure for the polarity of the copolymer (A) and (b) is another measure for the polarity of MEK-soluble matters in the high α-methylstyrene-content ABS resin (B) and/or the maleimide-type ABS resin (C).

Hence, (a)–(b) shows the difference between MEK-soluble matters polarity of the copolymer (A), the high α-methylstyrene-content ABS resin (B) and/or the maleimide-type ABS resin (C), this representing the difference in compatibility. The smaller the value (a)–(b), the higher the compatibility between the resins represented.

(a) and (b) as the measure of polarity are the polarity of acrylic esters, methacrylic esters and maleimide compounds weight-converted into that of vinyl cyanide compounds. It is assumed that the polarity of vinyl cyanide compounds and that of maleimide compounds are on the same level and the polarity of acrylic esters and methacrylic esters is 1/10 (weight-conversion ratio) of that of vinyl cyanide compounds.

In other words, (a)–(b) shows that, when the difference is deemed to be that in the content of vinyl cyanide compound, the difference between the amount of vinyl cyanide compound in the copolymer (A) and the amount of vinyl cyanide compound in MEK-soluble matters of the high α-methylstyrene-content ABS resin (B) and/or the maleimide-type ABS resin (C) is not more than 10 weight %.

As mentioned above, it is possible according to the present invention to provide a good thermoplastic resin composition preferably not less than 90° C. in thermal deformation temperature, not more than 620 kg/cm² in bending strength at 23° C., not more than 20,000 kg/cm² in bending modulus and not less than 10 kg.cm/cm in Izod impact strength and, more preferably, not less than 95° C. in thermal deformation temperature, not more than 580 kg/cm² in bending strength at 23° C., not more than 19,000 kg/cm² in bending modulus and not less than 15 kg.cm/cm in Izod impact strength.

The present invention will be described below in great detail with reference to examples and comparative examples but the invention is not limited thereby.

In the following "part" and "%" will ean "weight part" and "weight %", unless otherwise specified. Examples 1–6, Comparative Examples 1–7:

(I) Production of copolymers (A)

Production of acrylic ester-type copolymers (A-1)–(A-4)

A-1: 250 parts of water and 2 parts of sodium alkylbenzene sulfonate were charged into a polymerization vessel provided with a stirrer and after deoxidation and subsequent heating to 70° C. in nitrogen current under stirring, 0.3 part of potassium persulfate was charged additionally, followed by continuous dripping over 6 hours of a monomer mixture of 70 parts of butyl acrylate, 30 parts of acrylonitrile and 0.25 parts of tertiary dodecyl mercaptan, and, after dripping was over, stirring was continued for another 1 hour at 70° C. until the completion of polymerization.

The polymerization conversion was 98%, reduction viscosity was 0.51 dl/g and gel content was 0%.

A-2: The same procedure as A-1 was made except that the monomer mixture was of 40 parts of butyl acrylate, 40 parts of ethyl acrylate, 20 parts of acrylonitrile and 0.3 part of tertiary dodecyl mercaptan.

The polymerization conversion was 99%, reduction viscosity was 0.40 dl/g and gel content was 0%.

A-3: The same procedure as A-1 was made except that the monomer mixture was of 70 parts of butyl acrylate, 30 parts of styrene and 0.2 part of tertiary dodecyl mercaptan.

The polymerization conversion was 98%, reduction viscosity was 0.45 dl/g and gel content was 0%.

A-4: The same procedure as A-1 was made except that the monomer mixture was of 30 parts of butyl acrylate, 20 parts of acrylonitrile, 50 parts of methyl methacrylate and 0.3 part of tertiary dodecyl mercaptan.

The polymerization conversion was 98%, reduction viscosity was 0.43 dl/g and gel content was 0%. Production of olefin-type copolymer (A-5):

A-5: An olefin-type copolymer was made by polymerizing 70 parts of ethylene, 10 parts of carbon monoxide and 20 parts of butyl acrylate according to Japanese Laid-open Patent Publication No. 1257/'92.

The polymerization conversion was 98% and melt index was 6 g/10 min.

The glass transition temperatures, reduction viscosities and (a)-values for the aforementioned polymers (A-1)–(A-5) are shown in Table 1.

TABLE 1

| Copolymer (A) | A-1 | A-2 | A-3 | A-4 | A-5 |
|---|---|---|---|---|---|
| BA | 70 | 40 | 70 | 30 | 20 |
| EA | 40 | — | — | — | — |
| MMA | — | — | — | 50 | — |
| AN | 30 | 20 | — | 20 | — |
| St | — | — | 30 | — | — |
| Et | — | 13 | — | — | 70 |
| Co | — | — | — | — | 10 |
| Glass transition temp. | −25 | −20 | −27 | 40 | −80 |
| Reduction viscosity | 0.51 | 0.40 | 0.45 | 0.43 | — |
| (a) - value | 37 | 28 | 7 | 28 | 2 |

(a) = Vinyl cyaanide weight % of the copolymer (A) + [acrylic ester weight % + methacrylic ester weight %]/10

In table 1,
BA: Butyl acrylate
EA: Ethyl acrylate
MMA: Methyl methacrylate
AN: Acrylonitrile
St: Styrene (II) Production of ABS resins (B), (C), (D)

B-1 (High α-methylstyrene-content ABS resin):

B-1-G: 70 parts (converted into solid) of a polybutadiene latex 0.25 μm in weight average particle size and 250 parts of water were charged into a polymerization vessel provided with a stirrer and after deoxidation and subsequent heating to 70° C. in nitrogen current under stirring, 0.2 part of potassium persulfate was charged additionally, followed by continuous dripping over 4 hours of a monomer mixture of 9 parts of acrylonitrile and 21 parts of styrene, and 1 part of potassium rosinate, and after dripping was over, stirring was continued for another 1 hour at 70° C. until the completion of polymerization.

B-1-F: 250 parts of water and 2 parts of sodium alkylbenzene sulfonate were charged into the polymerization vessel provided with a stirrer and after deoxidation and subsequent heating to 70° C. in nitrogen current under stirring, 0.3 part of potassium persulfate was charged additionally, followed by continuous dripping over 6 hours of a monomer mixture of 70 parts of α-methylstyrene, 30 parts of acrylonitrile and 0.45 part of tertiary dodecyl mercaptan, and after dripping was over, stirring was continued for another 1 hour at 70° C. until the completion of polymerization.

(B-1-G) and (B-1-F) thus obtained were mixed at a weight ratio of 33:67 (converted into solid).

B-2 (High α-methylstyrene-content ABS resin):

B-2-G: The same procedure as (B-1-G) was made except that the monomer mixture was of 5 parts of methyl methacrylate, 10 parts of butyl acrylate and 25 parts of styrene.

B-2-F: The same procedure as (B-1-F) was made except that the monomer mixture was of 65 parts of α-methylstyrene, 30 parts of methyl methacrylate, 5 parts of acrylonitrile and 0.2 part of tertiary dodecyl mercaptan.

(B-2-G) and (B-2-F) thus obtained were mixed at a weight ratio of 4:6 (converted into solid).

C-1 (Maleimide-type ABS resin)

C-1-F: The same procedure as (B-1-F) was made except that the monomer mixture was of 22 parts of phenylmaleimide, 22 parts of acrylonitrile, 56 parts of styrene and 0.3 part of tertiary dodecyl mercaptan.

The aforementioned (B-1-G) and (C-1-F) thus obtained were mixed at a weight ratio of 3:7 (converted into solid).

D-1 (ABS resin not containing α-methylstyrene)

D-1-F: The same procedure as (B-1-F) was made except that the monomer mixture was of 70 parts of styrene, 30 parts of acrylonitrile and 0.45 part of tertiary dodecyl mercaptan.

The aforementioned (B-1-G) and (D-1-F) thus obtained were mixed at a weight ratio of 3:7 (converted into solid).

The composition, thermal deformation temperature, reduction viscosity and (b)-values of the ABS resins described above (B-1), (B-2), (C-1) and (D-1) are shown in Table 2 below.

TABLE 2

| | | ABS resins (B), (C), (D) | | | | | | | |
|---|---|---|---|---|---|---|---|---|---|
| | | B-1 | | B-2 | | C-1 | | D-1 | |
| | | Copolymer B-1-F (Bc) | Graft copolymer B-1-G (Bg) | Copolymer B-2-F (Bc) | Graft copolymer B-2-G (Bg) | Copolymer C-1-F (Cc) | Copolymer B-1-G (Cg) | Graft copolymer D-1-F (Bc') | Copolymer B-1-G (Bg') |
| Composition | PBD | — | 70 | — | 60 | — | 70 | — | 70 |
| | AN | 30 | 9 | 5 | — | 22 | 9 | 30 | 9 |
| | St | — | 21 | — | 25 | 56 | 21 | 70 | 21 |
| | PMI | — | — | — | — | 22 | — | — | — |
| | αS | 70 | — | 65 | — | — | — | — | — |
| | MMA | — | — | 30 | 5 | — | — | — | — |
| | BA | — | — | — | 10 | — | — | — | — |
| Ratio of copolymer and graft copolymer | | 67:33 | | 60:40 | | 70:30 | | 70:30 | |
| Thermal deformation temp (°C.) | | 108 | | 109 | | 114 | | 75 | |
| Reduction viscosity (dl/g) | | 0.60 | | 0.48 | | 0.67 | | 0.61 | |
| (b)-value | | 29 | | 7 | | 33 | | 29 | |

(b) = Vinyl cyanide weight % in methyl ethyl ketone-soluble matters of ABS resins (B), (C), (D) + maleimide weight % + [acrylic ester weight % + methacrylic ester weight %]/10.

In Table 2,

PBD: Polybutadiene

PMI: Phenylmaleimide

αS: α-methylstyrene (III) Production of thermoplastic resin composition (A-1)–(A-5) and ABS resins (B-1), (B-2), (C-1) and (D-1) thus obtained were mixed in latex form at the ratios shown in Table 3, admixed with a phenolic antioxidant, coagulated with addition of calcium chloride and then rinsed, filtrated, dried and powdery products were thus obtained.

When the copolymer (A-5) was used, it was mixed with ABS resin in powder form.

The powders thus obtained were extruded by a Vent-type extruder at a set temperature of 260° C. and then pelletized for use in the measurement of various physical properties. The measured results are shown in Table 3.

Further, the compositions and the characteristics of the copolymer (A), the copolymer (Bc) and the graft copolymer (Bg) of the ABS resin (B), the copolymer (Cc) and the graft copolymer (Cg) of the ABS resin (C), and the copolymer (Bc') and the graft copolymer (Bg') of the ABS resin (D), used in Examples 1–6 and Comparative Examples 1–7 are shown in a lump in Tables 4 and 5.

Measurement of physical properties was made by the following methods.

Bending strength: ASTM D-790 23° C. (kg/cm²)

Bending modulus: ASTM D-790 23° C.×10³ (kg/cm²)

Tensile strength: ASTM D-683 23° C. (kg/cm²)

Thermal deformation temperature: ASTM D-648-56 load 18.6 kg/cm² (°C.)

Vicar softening point: ISO R-306 load 5 kg/cm² (°C.)

Izod impact strength: ASTM D-256 23° C. (kg.cm/cm)

Spiral flow value: By the use of a 3-ounce injection molding machine: nozzle temperature 250° C., injection pressure 1,000 kg/cm², mold temperature 40° C. (mm)

Peeling resistance: Plates 150 mm long, 100 mm wide and 2.5 mm thick were made by injection molding machine. a falling weigh% test was made at 23° C. and the fracture face was examined visually.

○: No peeling noticeable.
X: Peeling noticeable.

TABLE 3

| | | Example | | | | | | Comparative Example | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Copolymer (A) | A-1 | 15 | | | 5 | 10 | 40 | | | | 80 | | | |
| | A-2 | | 20 | | | | | 20 | | | | | | |
| | A-3 | | | | | | | | 20 | | | | | |
| | A-4 | | | | | | | | | 20 | | | | |
| | A-5 | | | 30 | | | | | | | | | | |
| Styrene-type resin (B) | B-1 | 85 | | | | | | | | | | | 100 | |
| | B-2 | | | 70 | | | | | | | | | | |
| (C) | C-1 | | 80 | | 95 | 90 | 60 | | 80 | 80 | 20 | | 100 | |
| (D) | D-1 | | | | | | | 80 | | | | | | 100 |
| Bending strength | | 520 | 490 | 460 | 600 | 565 | 416 | 201 | 410 | 670 | 114 | 710 | 680 | 340 |
| Bending modulus (× 10³) | | 16 | 15 | 14 | 19 | 18 | 15 | 10 | 15 | 23 | 9 | 21 | 21 | 14 |
| Tensile strength | | 360 | 305 | 300 | 400 | 360 | 320 | 150 | 311 | 450 | 95 | 490 | 485 | 260 |
| Thermal deformation temp. | | 979 | 104 | 95 | 106 | 110 | 97 | 65 | 101 | 106 | 45 | 108 | 114 | 75 |
| Vicat softening point | | 111 | 121 | 109 | 121 | 129 | 113 | 78 | 111 | 122 | 60 | 120 | 130 | 87 |
| Izod impact strength | | 26 | 21 | 20 | 25 | 20 | 26 | 45 | 4 | 11 | 41 | 21 | 18 | 38 |
| Spiral flow value | | 680 | 760 | 670 | 610 | 710 | 860 | 400 | 740 | 610 | 940 | 480 | 590 | 350 |
| Peeling resistance | | ○ | ○ | ○ | ○ | ○ | ○ | ○ | X | ○ | ○ | ○ | ○ | ○ |
| (a)-(b) | | 8 | -5 | -5 | 4 | 4 | 4 | -5 | 26 | -5 | 4 | — | — | — |

TABLE 4

| | Example 1 | | | Example 2 | | | Example 3 | | | Example 4 | | | Example 5 | | | Example 6 | | |
|---|---|---|---|---|---|---|---|---|---|---|---|---|---|---|---|---|---|---|
| | A-1 | B-1 | | A-2 | C-1 | | A-5 | B-2 | | A-1 | C-1 | | A-1 | C-1 | | A-1 | C-1 | |
| | A | Bc | Bg | A | Cc | Cg | A | Bc | Bg | A | Cc | Cg | A | Cc | Cg | A | Cc | Cg |
| PBD | — | — | 70 | — | — | 70 | — | — | 60 | — | — | 70 | — | — | 70 | — | — | 70 |
| AN | 30 | 30 | 9 | 20 | 22 | 9 | — | 5 | — | 30 | 22 | 9 | 30 | 22 | 9 | 30 | 22 | 9 |
| St | — | — | 21 | — | 56 | 21 | — | — | 25 | — | 56 | 21 | — | 56 | 21 | — | 56 | 21 |
| αS | — | 70 | — | — | — | — | — | 65 | — | — | — | — | — | — | — | — | — | — |
| PMI | — | — | — | — | 22 | — | — | — | — | — | 22 | — | — | 22 | — | — | 22 | — |
| BA | 70 | — | — | 40 | — | — | 20 | — | 10 | 70 | — | — | 70 | — | — | 70 | — | — |
| EA | — | — | — | 40 | — | — | — | 30 | 5 | — | — | — | — | — | — | — | — | — |
| MMA | — | — | — | — | — | — | 70 | — | — | — | — | — | — | — | — | — | — | — |
| Et | — | — | — | — | — | — | 10 | — | — | — | — | — | — | — | — | — | — | — |
| CO | — | — | — | — | — | — | — | — | — | — | — | — | — | — | — | — | — | — |
| Glass transition temp. (°C.) | -25 | — | — | -20 | — | — | -80 | — | — | -25 | — | — | -25 | — | — | -25 | — | — |
| Thermal deformation temp. (°C.) | — | 108 | — | — | 114 | — | — | 109 | — | — | 114 | — | — | 114 | — | — | 114 | — |
| Reduction Viscosity (dl/g) | 0.51 | 0.60 | — | 0.40 | 0.67 | — | — | 0.48 | — | 0.51 | 0.67 | — | 0.51 | 0.67 | — | 0.51 | 0.67 | — |
| (a) | 37 | — | | 28 | — | | 2 | — | | 37 | — | | 37 | — | | 37 | — | |
| (b) | — | 29 | | — | 33 | | — | 7 | | — | 33 | | — | 33 | | — | 33 | |

TABLE 5

| | Comp. Ex. 1 | | | Comp. Ex. 2 | | | Comp. Ex. 3 | | | Comp. Ex. 4 | | | Comp. Ex. 5 | | | Comp. Ex. 6 | | | Comp. Ex. 7 | | |
|---|---|---|---|---|---|---|---|---|---|---|---|---|---|---|---|---|---|---|---|---|---|
| | A-2 | D-1 | | A-3 | C-1 | | A-4 | C-1 | | A-1 | C-1 | | — | B-1 | | — | C-1 | | — | D-1 | |
| | A | Bc | Bg | A | Cc | Cg | A | Cc | Cg | A | Cc | Cg | A | Bc | Bg | A | Cc | Cg | A' | Bc' | Bg' |
| PBD | — | — | 70 | — | — | 70 | — | — | 70 | — | — | 70 | — | — | 70 | — | — | 70 | — | — | ⊕ |

TABLE 5-continued

|  | Comp. Ex. 1 | | | Comp. Ex. 2 | | | Comp. Ex. 3 | | | Comp. Ex. 4 | | | Comp. Ex. 5 | | | Comp. Ex. 6 | | | Comp. Ex. 7 | | |
|---|---|---|---|---|---|---|---|---|---|---|---|---|---|---|---|---|---|---|---|---|---|
|  | A-2 | D-1 | | A-3 | C-1 | | A-4 | C-1 | | A-1 | C-1 | | — | B-1 | | — | C-1 | | — | D-1 | |
|  | A | Bc | Bg | A | Cc | Cg | A | Cc | Cg | A | Cc | Cg | A | Bc | Bg | A | Cc | Cg | A' | Bc' | Bg' |
| AN | 20 | 30 | 9 | — | 22 | 9 | 20 | 22 | 9 | 30 | 22 | 9 | — | 30 | 9 | — | 22 | 9 | — | 30 | 9 |
| St | — | 70 | 21 | 30 | 56 | 21 | 30 | 56 | 21 | — | 56 | 21 | — | — | 21 | — | 56 | 21 | — | 70 | 21 |
| αS | — | — | — | — | 22 | — | — | 22 | — | — | 22 | — | — | 70 | — | — | 22 | — | — | — | — |
| PMI | — | — | — | — | — | — | — | — | — | — | — | — | — | — | — | — | — | — | — | — | — |
| BA | 40 | — | — | 70 | — | — | — | — | — | 70 | — | — | — | — | — | — | — | — | — | — | — |
| EA | 40 | — | — | — | — | — | — | — | — | — | — | — | — | — | — | — | — | — | — | — | — |
| MMA | — | — | — | — | — | — | 50 | — | — | — | — | — | — | — | — | — | — | — | — | — | — |
| Et | — | — | — | — | — | — | — | — | — | — | — | — | — | — | — | — | — | — | — | — | — |
| CO | — | — | — | — | — | — | — | — | — | — | — | — | — | — | — | — | — | — | — | — | — |
| Glass transition temp. (°C.) | −20 | — | — | −27 | — | — | 40 | — | — | −25 | — | — | −25 | — | — | — | — | — | — | — | — |
| Thermel deformation temp. (°C.) | — | 75 | | — | 114 | | — | 114 | | — | 114 | | — | 108 | | — | 114 | | — | 75 | |
| Reduction Viscosity (dl/g) | 0.40 | 0.61 | — | 0.45 | 0.67 | — | 0.43 | 0.67 | — | 0.51 | 0.67 | — | 0.51 | 0.60 | — | — | 0.67 | — | — | 0.61 | — |
| (a) | 28 | — | 7 | — | 28 | — | 37 | — | — | — | — | — | — | — | — | — | — | — | — | — | — |
| (b) | — | 29 | — | 33 | — | 33 | — | 33 | — | 29 | — | 33 | — | 29 | | | | | | | |

As seen from Table 3, the thermoplastic resin compositions of the present invention is low in stiffness e.g. bending strength, high in modulus of elasticity e.g. bending modulus, excelled in resistance to thermal deformation, impact strength etc. as well as in moldability and surface characteristic of the molded article.

Examples 7–10, Comparative Examples 8–10

Figure 1:
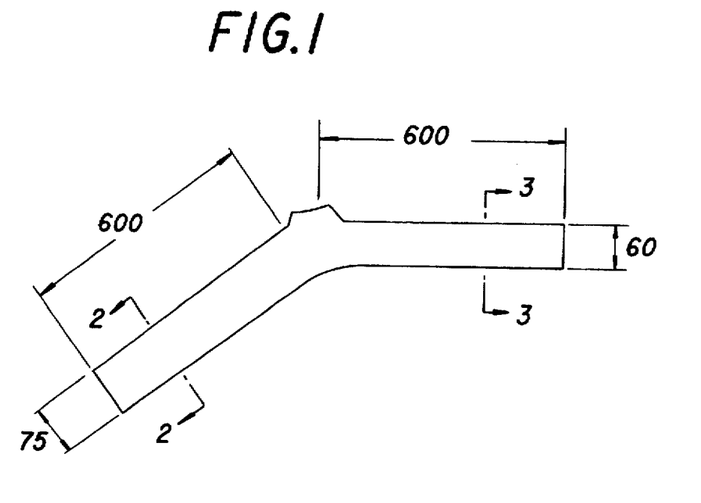
FIG. 1 is a schematic view of a front pillar garnish. The numeral unit is mm.
Figure 2:
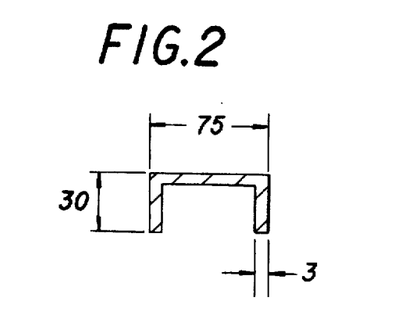
FIG. 2 is an enlarged sectional view of the front pillar garnish of FIG. 1 taken along the line A—A. The numeral unit is mm.
Figure 3:
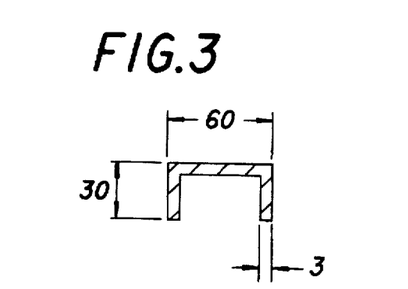
FIG. 3 is another enlarged sectional view of the front pillar garnish of FIG. 1 taken along the line B—B. The numeral unit is mm.

The thermoplastic resin compositions for Examples 1, 4, 5, 6 and Comparative Examples 1, 2, 5 shown in Table 3 were used for molding of front pillar garnishes shown in FIG. 1 by the use of an injection molding machine and supplied for the measurement of various physical properties. The results are shown in Table 6.

Measurement of physical properties was made by the following methods.

Heat resistance test: The molded specimen shown in FIG. 1 was fixed to a device corresponding to an automobile panel, the specimen was irradiated by an infrared lamp for 4 hours at an atmospheric temperature of 80° C. until the surface temperature of the specimen reached 105° C. and after cooling the wariness was judged by visual inspection.

○: No waviness noticeable.

X: Waviness noticeable.

Impact-induced maximum stress: The molded specimen as shown in FIG. 1 was fixed, a 5 kg spindle (tip R=30) was fallen from a height of 1.5 m at the point of the A—A line and the maximum stress was measured by instrumentation impact test [KN: Kilo-newton (23° C.)].

Impact energy absorptivity: This was measured at the same time as the measurement of impact-induced maximum stress (J: joule).

Appearance of molded article: The appearance of the molded article was examined visually and evaluated according to the following 3-step evaluation criteria.

○: Burn, flow mark, gate mark and a failure at the time of peeling are not noticeable.

Δ: Burn, flow mark, gate mark and a failure at the time of peeling are noticeable.

X: Burn, flow mark, gate mark and a failure at the time of peeling are markedly noticeable.

TABLE 6

| | Example | | | | Comparative Example | | |
|---|---|---|---|---|---|---|---|
| Thermopastic resin composition | 7 Comp. of Ex. 1 | 8 Comp. of Ex. 4 | 9 Comp. of Ex. 5 | 10 Comp. of Ex. 6 | 8 Comp. of C. Ex. 1 | 9 Comp. of C. Ex. 2 | 10 Comp. of C. Ex. 5 |
| Heat resistance test | ○ | ○ | ○ | ○ | X | ○ | ○ |
| Impact-induced maximum stress | 2.5 | 3.5 | 3.0 | 2.1 | 1.5 | 1.0 | 4.5 |
| Impact energy absorptivity | 30 | 26 | 28 | 36 | 30 | 2 | 22 |
| Appearance of molded article | ○ | ○ | ○ | ○ | ○ | X | Δ |

From Table 6 it is apparent that the trim for interior decoration of automobile made by molding the resin compositions of the present invention are good in external appearance, small in deformation at high temperatures, low in impact-induced stress, high in impact energy absorptivity and excelled in safety.

Comparative Examples 11 and 12

Thermoplastic resin compositions were produced by the methods described in Japanese Laid-open Patent publication No. 179257/'83 and Japanese Laid-open Patent publication No. 17954/'88 and measurement was made of various physical properties. Also front pillar garnishes as shown in FIG. 1 were molded of these resin compositions and measurement was also made of various physical properties.

The compositions of copolymers, graft copolymers and maleimide copolymers are shown in Table 7, the mixing ratios of thermoplastic resin compositions and the results of measurement of various physical properties are shown in Table 8 and the results of measurement of various physical properties of the front pillar garnishes are shown in Table 9.

TABLE 7

| | Comp. Ex. 11 | | | Comp. Ex. 12 | | | |
|---|---|---|---|---|---|---|---|
| | Co-polymer A' | Co-polymer Bc' | Graft Co-polymer Bg' | Co-polymer A' | Co-polymer Bc' | Graft Co-polymer Bg' | Male-imide type resin C' |
| PBD | — | — | 40 | — | — | 50 | 10 |
| AN | — | 30 | 18 | — | 30 | 15 | — |
| St | — | 70 | 42 | — | 70 | 35 | 40 |
| PMI | — | — | — | — | — | — | 50 |
| BA | 70 | — | — | 70 | — | — | — |
| MMA | 30 | — | — | 30 | — | — | — |
| EGDM | 0.5 | — | — | — | — | — | — |
| Gel content | 53 | — | — | — | — | — | — |
| Glass transition temp. °C. | −24 | — | — | −26 | — | — | — |

EGDM: Ethylene glycol dimethacrylate

TABLE 8

| | Comp. Ex. 11 | | | Comp. Ex. 12 | | | |
|---|---|---|---|---|---|---|---|
| | Co-polymer A' | Co-polymer Bc' | Graft Co-polymer Bg' | Co-polymer A' | Co-polymer Bc' | Graft Co-polymer Bg' | Male-imide type resin C' |
| Mixing ratio (Wt. %) | 10 | 52 | 38 | 7 | 23 | 40 | 30 |
| Bending strength | 550 | | | 660 | | | |
| Bending modulus (× 10³) | 16 | | | 20 | | | |
| Tensile strength | 390 | | | 480 | | | |
| Thermal deformation temp. | 70 | | | 113 | | | |
| Vicat softening point | 82 | | | 132 | | | |
| Izod impact strength | 35 | | | 17 | | | |
| Spiral flow value | 580 | | | 450 | | | |
| Peeling resistance | o | | | o | | | |
| (a)-(b) | 20 | | | 30–56 | | | |

TABLE 9

| Thermoplastic resin composition | Comp. Ex. 13 Comp. of C. Ex. 11 | Comp. Ex. 14 Comp. of C. Ex. 12 |
|---|---|---|
| Heat resistance test | x | o |
| Impact-induced maximum stress | 3.6 | 1.0 |
| Impact energy absorptivity | 26 | 7 |
| Appearance of molded article | o | o |

In the composition of Comparative Example 11, a vinyl cyanide compound is not used in the copolymer A' and a high α-methylstyrene conpolymer is not used as the compolymer Bc', it is inferior in thermal defomation resistance. In the composition of Comparative Example 12, a vinyl cyanide compound is not used in the copolymer A' and a vinyl cyanide compound is not used either in the copolymer C', it is not only inferior in impact strength, but low in impact energy absorptivity. Further, since both the compositions of Comparative Examples 11 and 12 exceed 10 in (a)–(b) values, impact energy absorptivity tends to lower more markedly.

Possibility of industrial utilization

As mentioned above, the thermoplastic resin composition of the present invention is excelled in moldability and the molded articles are low in stiffness and excelled in resistance to thermal deformation, impact strength and surface characteristics.

The trim parts for interior decoration of automobiles molded of the thermoplastic resin composition of the present invention are good in surface appearance, less subject to deformation at high temperatures, low in impact-induced stress, high in impact energy absorptivity and excelled in safety.

We claim:

1. A thermoplastic resin composition consisting essentially of 5–55 weight % of a copolymer (A) whose glass transition temperature is not more than 0° C., and 95–45 weight % of a high α-methylstyrene-content ABS resin (B) and/or a maleimide ABS resin (C), both (B) and (C) being not less than 100° C. in thermal deformation temperature (load 18.6 kg/cm²), wherein said copolymer (A) is an acrylic ester copolymer comprising 40–85 weight % of alkyl (meth)acrylates, not more than 25 weight % of aromatic vinyl compounds and 15–35 weight % of vinyl cyanide compounds, having 0.2–1.5 dl/g in reduction viscosity (30° C., in N, N-dimethylformamide solution), said high α-methylstyrene-content ABS resin (B) is comprised of 30–85 weight % of a copolymer (Bc) comprising 60–80 weight % of α-methylstyrene, not more than 25 weight % of aromatic vinyl compounds and 20–35 weight % of vinyl cyanide compounds and having 0.3–1.5 dl/g in reduction viscosity (30° C., in N, N-dimethylformamide solution), and 70–15 weight % of a graft copolymer (Bg) comprising 30–90 weight % of at least one rubber polymer selected from the group consisting of diene rubbers, olefin rubbers and acryl rubbers grafted with 70–10 weight % of a monomer mixture of 20–90 weight % of aromatic vinyl compounds, not more than 40 weight % of vinyl cyanide, not more than 85 weight % of alkyl methacrylates and 0–20 weight % of other copolymerizable monomers.

said maleimide ABS resin (C) is comprised of

30–85 weight % of a copolymer (Cc) comprising 10–50 weight % of maleimide compounds, 80–15 weight % of aromatic vinyl compounds, 10–35 weight % of vinyl cyanide compounds and 0–20 weight % of other copolymerizable monomers and having 0.3–1.5 dl/g in reduction viscosity (30° C., in N, N-dimethylformamide solution), and 70–15 weight % of a graft copolymer (Cg) comprising 30–90 weight % of at least one rubber polymer selected from the group consisting of diene rubbers, olefin rubbers and acryl rubbers grafted with 70–10 weight % of a monomer mixture of 20–90 weight % of aromatic vinyl compounds, not more than 40 weight % of vinyl cyanide compounds, not more than 85 weight % of alkyl methacrylates and 0–20 weight % of other polymerizable monomers, and said resin composition is not less than 10 kg cm/cm in Izod impact strength (23° C.).

2. The thermoplastic resin composition according to claim 1, wherein (a) a measure for the polarity of the copolymer (A), (b) a measure for the polarity of the high α-methylstyrene-content ABS (B) and (c) a measure for the polarity of the maleimide ABS resin (C), in which the polarity of said (A), (B) and (C) is converted to vinyl cyanide weight % contained said (A), (B) and (C), are within a range of −10 weight % ≦ (a)−(b) ≦ 10 weight %, and −10 weight % ≦ (a)−(c) ≦ 10 weight %

(a)=Vinyl cyanide weight % of the copolymer (A)+/10

(b)=Vinyl cyanide weight % of the high α-methylstyrene-content ABS resin (B)+/10

(c)=Vinyl cyanide weight % of the maleimide ABS resin (C)+maleimide weight %+/10.

3. The thermoplastic resin composition according to claim 1, wherein its thermal deformation temperature is not less than 90° C., its bending strength at 23° C. is not more than 620 kg/cm$^2$ and its bending modulus is not more than 20,000 kg/cm$^2$.

4. The thermoplastic resin composition according to claim 1, wherein its thermal deformation temperature is not less than 95° C., its bending strength at 23° C. is not more than 580 kg/cm$^2$ and its bending modulus is not more than 19,000 kg/cm$^2$.

5. Trim parts for interior decoration of automobiles molded of any of the thermoplastic resin compositions according to any one of claims 1–4.

* * * * *